US008654012B2

(12) United States Patent
Kim et al.

(10) Patent No.: US 8,654,012 B2
(45) Date of Patent: Feb. 18, 2014

(54) TAG ANTENNA USING MICROSTRIP LINE, METHOD OF MANUFACTURING THE SAME AND RADIO FREQUENCY IDENTIFICATION TAG

(75) Inventors: Jeong-seok Kim, Daejeon-si (KR); Hae-won Son, Jeonju-si (KR); Won-kyu Choi, Daejeon-si (KR); Gil-young Choi, Daejeon-si (KR); Jong-suk Chae, Daejeon-si (KR)

(73) Assignees: Electronics and Telecommunications Research Institute (KR); Industrial Cooperation Foundation Chonbuk National University (KR)

( * ) Notice: Subject to any disclaimer, the term of this patent is extended or adjusted under 35 U.S.C. 154(b) by 854 days.

(21) Appl. No.: 12/688,753

(22) Filed: Jan. 15, 2010

(65) Prior Publication Data

US 2010/0314453 A1    Dec. 16, 2010

(30) Foreign Application Priority Data

Jun. 16, 2009    (KR) .................. 10-2009-0053591

(51) Int. Cl.
*H01Q 1/38* (2006.01)
(52) U.S. Cl.
USPC .................................. 343/700 MS; 343/702
(58) Field of Classification Search
USPC ................... 343/700 MS, 702, 718
See application file for complete search history.

(56) References Cited

U.S. PATENT DOCUMENTS 5,706,015 A *  1/1998  Chen et al. ............. 343/700 MS
5,781,158 A     7/1998  Ko et al.
6,008,764 A * 12/1999  Ollikainen et al. ..... 343/700 MS
6,097,347 A     8/2000  Duan et al.
7,629,929 B2  12/2009  Son et al.
2004/0027286 A1*  2/2004  Poilasne et al. ......... 343/700 MS
2005/0275590 A1* 12/2005  Eom et al. .............. 343/700 MS
2007/0046559 A1   3/2007  Youn
2008/0309578 A1  12/2008  Son et al.
2009/0140928 A1   6/2009  Choi et al.

FOREIGN PATENT DOCUMENTS

KR        100139438 B1      7/1998
KR        100139439 B1      7/1998
KR      1020060004932 A     1/2006
WO      WO 2004/093249 A1  10/2004

OTHER PUBLICATIONS

H.-W. Son, "Design of RFID Tag Antenna for Metallic Surfaces Using Lossy Substrate," *Electronics Letters*, vol. 44, No. 12, Jun. 5, 2008, 2 pages.

* cited by examiner

*Primary Examiner* — Hoanganh Le
(74) *Attorney, Agent, or Firm* — Blakely Sokoloff Taylor & Zafman

(57) ABSTRACT

Disclosed is a Radio Frequency Identification (RFID) tag antenna. The tag antenna includes a lower dielectric substrate and an upper dielectric substrate. The lower dielectric substrate is provided at a lower surface thereof with a ground plane and at an upper surface thereof with two microstrip lines. The microstrip lines each have an open-end, the open ends spaced apart from each other from a middle of the lower dielectric substrate while facing each other to form a radiating slot from which radiation of electromagnetic waves occurs. The upper dielectric substrate is provided at an upper surface thereof with at least one electric capacitive device and is stacked on the lower dielectric substrate. The RFID tag antenna enhances radiation efficiency while achieving miniaturization.

8 Claims, 6 Drawing Sheets

TAG ANTENNA USING MICROSTRIP LINE, METHOD OF MANUFACTURING THE SAME AND RADIO FREQUENCY IDENTIFICATION TAG

CROSS-REFERENCE TO RELATED APPLICATION

This application claims the benefit under 35 U.S.C. §119 (a) of Korean Patent Application No. 10-2009-0053591, filed on Jun. 16, 2009, the disclosure of which is incorporated by reference in its entirety for all purposes.

BACKGROUND

1. Field

The following description relates to an antenna and a Radio Frequency Identification (RFID) tag.

2. Description of the Related Art

A radio frequency identification (RFID) tag is used in cooperation with a radio frequency identification (RFID) reader in various fields including materials management, security and so on. In general, if an object to which an RFID tag is attached is placed within a read zone of a RFID reader, the RFID reader modulates an RF signal having a predetermined carrier frequency and transmits an interrogation signal to the RFID tag. The RFID tag responses to the interrogation signal of the RFID reader.

That is, the RFID reader modulates continuous electromagnetic waves having a predetermined frequency to transmit an interrogation signal to the RFID tag. Then, the RFID tag performs a back-scattering modulation on the interrogation signal, thereby providing the RFID reader with information of the RFID tag stored in an internal memory thereof.

Back-scattering modulation is a transmission technology in which an RFID tag modulates the intensity or the phase of electromagnetic waves transmitted from an RFID reader through scattering, thereby sending information of the RFID tag to the RFID reader in the modulated electromagnetic waves.

A passive RFID tag rectifies electromagnetic waves transmitted from an RFID reader and uses the rectified electromagnetic waves as an operation power source thereof. In order for the passive RFID tag to normally operate, the intensity of signals received in the RFID tag needs to exceed a predetermined threshold value. In addition, to increase a read range of a passive RFID system, the RFID reader needs to maximize power transfer. However, since the power transfer of the RFID reader is subject to local regulations of the relevant country in addition to the federal communication commission (FCC) of the USA, the increase of power transfer is limited by the regulations. Accordingly, in order to maximize a read range of an RFID reader when the power transfer is limited, an RFID tag needs to effectively receive electromagnetic waves transmitted from the RFID reader.

As an example of enhancing the efficiency of an RFID tag, an additional matching circuit may be used. In general, an RFID tag includes an antenna, an RF front-end and a signal processor. The RF front-end and the signal processor are integrated into a signal chip. In this case, the antenna is conjugate-matched to the RF front end through the additional matching circuit, thereby maximizing the intensity of signals transmitted from the antenna to the RF front end. However, such a matching circuit including a capacitor and an inductor takes up a large area on a chip, resulting in disadvantages with respect to miniaturization and cost.

SUMMARY

Accordingly, in one aspect, there is provided a tag antenna capable of effectively achieving an impedance matching with a tag chip having a small resistance component and a large capacitive reactance component, and an RFID tag having the same.

In addition, in another aspect, there is provided a tag antenna suitable for miniaturization and capable of enhancing radiation efficiency and an RFID tag having the same.

In one general aspect, there is provided a tag antenna including a lower dielectric substrate and an upper dielectric substrate. The lower dielectric substrate is provided at a lower surface thereof with a ground plane and at an upper surface thereof with two microstrip lines. The microstrip lines each have an open-end, the open ends spaced apart from each other from a middle of the lower dielectric substrate while facing each other to form a radiating slot from which radiation of electromagnetic waves occurs. The upper dielectric substrate is provided at an upper surface thereof with at least one electric capacitive device and is stacked on the lower dielectric substrate.

The upper dielectric substrate includes one electric capacitive device to be stacked on one of the microstrip lines and two electric capacitive devices to be stacked on the other one of the microstrip lines.

In another general aspect, there is provided an RFID tag. The RFID tag includes a tag antenna including a lower dielectric substrate and an upper dielectric substrate, an RF front end, and a signal processor. The lower dielectric substrate is provided at a lower surface thereof with a ground plane and at an upper surface thereof with two microstrip lines. The microstrip lines each have a shorted end shorted to the ground plane and an open-end, the open ends spaced apart from each other from the middle of the lower dielectric substrate while facing each other to form a radiating slot from which radiation of electromagnetic waves occurs. The upper dielectric substrate is provided at an upper surface thereof with at least one electric capacitive device and is stacked on the lower dielectric substrate. The RF front end rectifies and detects an RF signal received from the tag antenna. The signal processor operates on a direct current voltage received from the RF front end.

In another general aspect, there is provided a method of manufacturing a tag antenna including a lower dielectric substrate and an upper dielectric substrate. The method is as follows. First, two microstrip lines are formed on an upper surface of the lower dielectric substrate, which is provided at a lower surface thereof a ground plane. The two microstrip lines each have a shorted end shorted to the ground plane and an open end, the open ends spaced apart from each other from a middle of the lower dielectric substrate while facing each other to form a radiating slot from which radiation of electromagnetic waves occurs. After that, one electric to capacitive device is stacked on the upper dielectric substrate while overlapping one of the microstrip lines, and two electric capacitive devices are stacked on the upper dielectric substrate while overlapping the other one of the microstrip lines. Finally, the upper dielectric substrate is stacked on the lower dielectric substrate.

The present invention provides a tag antenna capable of ensuring superior operational performance even if the tag antenna is attached to an object having high permittivity by use of a tag chip having a small resistance component and a large capacitive reactance component. In addition, the tag antenna can enhance radiation efficiency while achieving miniaturization.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
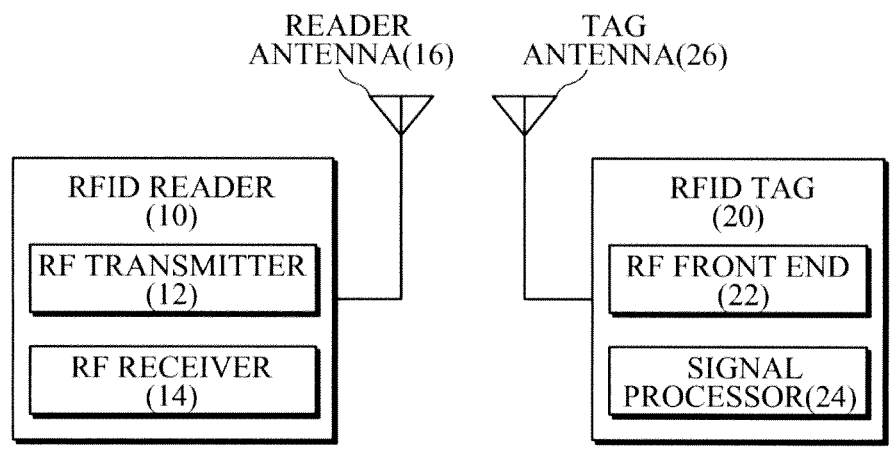
FIG. 1 is a block diagram of an exemplary RFID system.

FIG. 1 is a block diagram of an exemplary RFID system. As shown in FIG. 1, a radio frequency identification (RFID) system includes a RFID tag 20, an RFID reader 10 capable of reading and decoding data of the RFID tag and a host computer for processing data read by the RFID tag 20.

The RFID reader 10 includes an RF transmitter 12, an RF receiver 14 and a reader antenna 16. The reader antenna 16 is electrically connected to the RF transmitter 12 and the RF receiver 14. The RFID reader 10 transmits an RF signal to the RFID tag 20 through the RF transmitter 12 and the reader antenna 16. In addition, the RFID reader 10 receives an RF signal from the RFID tag 20 through the reader antenna 16 and the RF receiver 14. The configuration of the RFID reader 10 is well known in the art, and as such a detailed description of the RFID reader 10 will be omitted.

The RFID tag 20 includes an RFID front end 22, a signal processor 24 and a tag antenna 26. In the case that the RFID tag 20 is implemented as a passive type the RF front end 22 converts a received RF signal to a direct current voltage to provide power required for operating the signal processor 24. In addition, the RF front end 22 extracts a base band signal from the received RF signal. The signal processor 24 operates on the direct current voltage provided from the RF front end 22 and generates a response signal in response to a signal of the RF reader 10. The configuration of the RF front end 22 and the signal processor 24 is well known in the art, and as such a detailed description thereof will be omitted.

The RFID reader 10 modulates an RF signal having a predetermined carrier frequency and transmits an interrogation signal to the RFID tag 20. An RF signal generated from the RF transmitter 12 is externally transmitted through the reader antenna 16 in the form of an is electromagnetic wave. The electromagnetic wave externally transmitted is delivered to the tag antenna 26. The tag antenna 26 delivers the received electromagnetic wave to the RF front end 22. If the RF signal delivered to the RF front end 22 has a level exceeding a minimum power required to operate the RFID tag 20, the RFID tag 20 performs back-scattering modulation on the electromagnetic wave transmitted from the RFID reader 10, so that a response signal is transmitted in response to the interrogation signal of the RFID reader 10.

To improve the read range of the RFID system, the tag antenna 26 needs to efficiently deliver the electromagnetic wave to the RF front end 22. To this end, impedance conjugate matching between the tag antenna 26 and the RF front end 22 is required.

Figure 2:
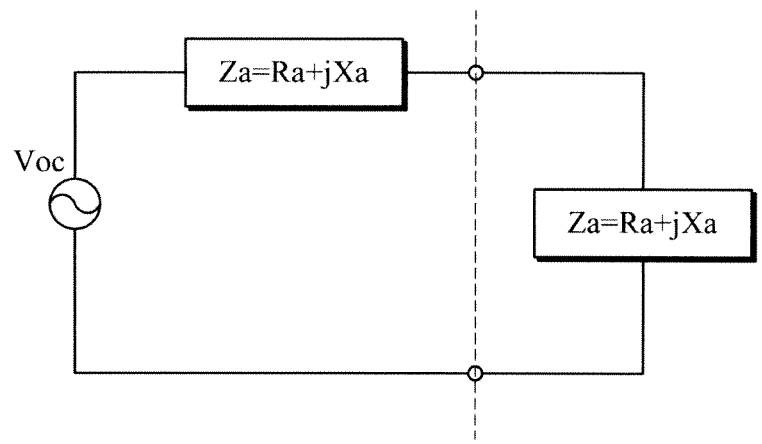
FIG. 2 is an equivalent circuit of a tag antenna and an RF front end.

FIG. 2 is an equivalent circuit of a tag antenna and an RF front end.

As shown in FIG. 2, the equivalent circuit includes a voltage source Voc, an antenna impedance Za and an RF front end impedance Zc. The voltage sources Voc and the antenna impedance Za correspond to an equivalent circuit of the tag antenna 26. The RF front end impedance Zc corresponds to an equivalent circuit of the RF front end 22. The antenna impedance Za has a resistance component Ra and a reactance component Xa. The RF front end impedance Zc has a resistance component Rc and a reactance component Xc.

In general, if the antenna impedance Za and the RF front end impedance Zc are conjugate matched, the power transfer from the tag antenna 26 to the RF front end 22 is maximized.

Conjugate matching is achieved when two complex impedances have equal absolute to values and phases having opposite signs. That is, if an impedance of the tag antenna 26 or an impedance of the RF front end 22 is adjusted such that Ra=Rc and Xa=−Xc, power transfer from the tag antenna 26 to the RF front end 22 is maximized.

The RF front end 22 of a passive RFID tag chip or a semi-passive RFID tag chip includes a rectifier/detector circuit using a diode but does not include an additional matching circuit, so that the tag chip is downsized. Accordingly, the RF front end 22 has a complex impedance different from a conventional complex impedance value of 50Ω, and has a small resistance component Rc and a large capacitive reactance component Xc at a ultra high frequency (UHF) band due to characteristics of the rectifier/detector circuit. Therefore, for the purpose of conjugate matching, the antenna impedance Za needs to have a small resistance component Ra and a large inductive reactance component Xa.

Figure 3:
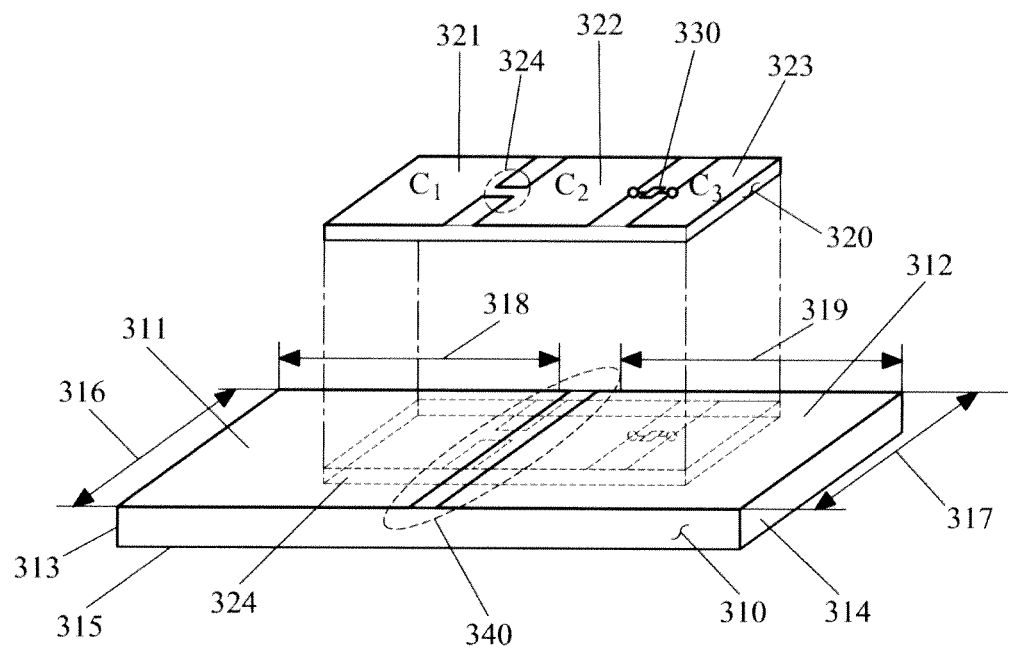
FIG. 3 is a view showing a configuration of an exemplary tag antenna.

FIG. 3 is a view showing a configuration of an exemplary tag antenna. As shown in FIG. 3, the tag antenna 26 includes two microstrip lines 311 and 312 each having a shorted end and three electric capacitive devices 321, 322 and 323 stacked on the microstrip lines 311 and 312. The electric capacitive device may include a planar type capacitor or an open-circuit stub using a microstrip line.

The exemplary electromagnetic capacitive devices 321, 322 and 323 are implemented using a planar type capacitor. The three electric capacitive devices 321, 322 and 323 are formed on the same dielectric substrate, that is, on an upper dielectric substrate 320 constituting the tag antenna 26.

As shown in FIG. 3, the two microstrip lines 311 and 312 are formed on the same dielectric substrate, that is, on an upper surface of a lower dielectric substrate 310 constituting the tag antenna 26. A ground plane 315 is formed on a lower surface of the lower dielectric subtract 310. A left side shorting plate 313 formed on one side of the lower dielectric substrate 310 serves to short the left microstrip line 311 to the ground plane 315. A right side shorting plate 314 formed on an opposite side of the lower dielectric substrate 310 serves to short the right microstrip line 312 to the ground plane 315. Respective open ends of the left microstrip line 311 and the right microstrip line 312 are spaced apart from each other from the middle of the lower dielectric plate while facing each other. A radiating slot 340 formed due to the open ends allows radiation of electromagnetic waves.

In addition, the upper dielectric substrate 320, on which the three electric capacitive devices, that is, planar type capacitors 321, 322 and 323 are stacked, is staked on the microstrip lines 311 and 312. As shown in FIG. 3, one 321 of the capacitors 321, 322 and 323 is stacked on the left microstrip line 311, and the two remaining capacitors 322 and 323 are stacked on the right microstrip line 312. A feed terminal 330 is formed between the two capacitors 322 and 323 stacked on the microstrip line 312 and is used to mount a predetermined component connected to the antenna 26, for example, a tag chip.

Figure 4:
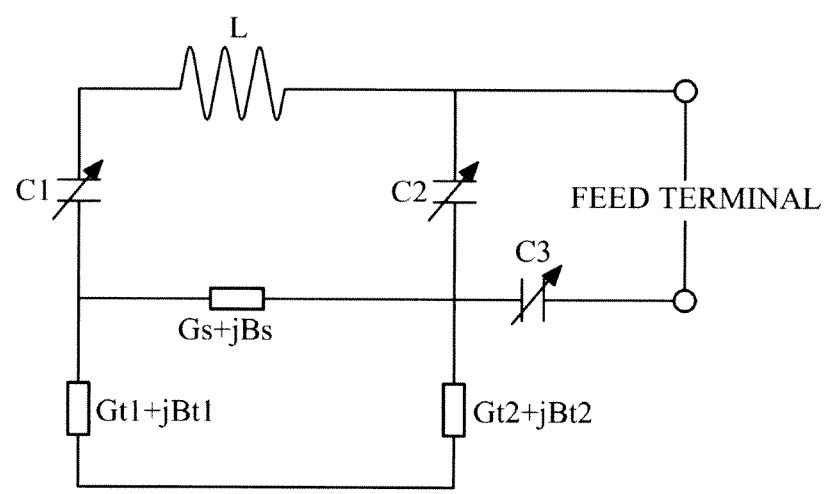
FIG. 4 is an equivalent circuit of the exemplary tag antenna.

FIG. 4 is an equivalent circuit of the exemplary tag antenna. $G_{t1}+jB_{t1}$ represents an input admittance of a shorted transmission line including the left microstrip line 311, and $G_{t2}+jB_{t2}$ represents an input admittance of a shorted transmission line including the right microstrip line 312. $G_s+jB_s$ represents an admittance of the radiating slot 340 formed between the open ends of the two microstrip lines 311 and 312. C1, C2 and C3 represent the capacitances of the three planar type capacitors 321, 322 and 323, respectively. The feed terminal is formed between the capacitor 322 having the capacitance of C2 and the capacitor 323 having the capacitance of C3.

Inductance "L" of an equivalent circuit shown in FIG. 4 represents the inductance between the capacitor 321 having the capacitance of C1 and the capacitor 322 having the capacitance of C2, wherein the capacitors 321 and 322 are stacked on different micro-lines, respectively. The inductance L increases with the increase in the distance between the capacitor 321 and the capacitor 322 and with the decrease in the width of a connection part between the capacitor 321 and the capacitor 322.

$G_{t1}+jB_{t1}$, $G_{t2}+jB_{t2}$ and $G_s+jB_s$ are determined by the shape of the left microstrip line 311 and the right microstrip line 312, the dielectric constant of the lower dielectric substrate 310 and the thickness of the lower dielectric constant 310. In general, if the left microstrip line 311 and the right microstrip line 312 have a larger width and the lower dielectric substrate 310 has a larger thickness, an equivalent conductance $G_s$ of the radiating slot 340 increases. In addition, if the dielectric loss of the lower dielectric substrate 310 has a higher value, the input conductance $G_{t1}$ and $G_{t1}$ of the shorted transmission lines increases.

Meanwhile, the input susceptance $B_{t1}$ is determined by the characteristic impedance and the length 318 of the left microstrip line 311, and the input susceptance $B_{t2}$ is determined by the characteristic impedance and the length 319 of the right microstrip line 312.

If the length of the left microstrip line 311 and the right microstrip line 312 is below 0.25 of the wavelength corresponding to the operation frequency of the tag antenna, the input admittance of the left shorted transmission line and the right shorted transmission line has an inductive susceptance. As described above, $G_{t1}+jB_{t1}$, $G_{t2}+jB_{t2}$ and $G_s+jB_s$ are adjusted by modifying the structure of the left microstrip line 311 and the right microstrip line 312. However, the adjusting of admittance based on the structure of the microstrip lines 311 and 312 is not efficient enough to achieve the impedance conjugate matching between the tag antenna 26 and the tag chip.

In the exemplary tag antenna 26, the antenna impedance Za is adjusted freely by use of the three capacitors 321, 322 and 323 formed on the upper dielectric substrate 320.

In FIG. 4, the antenna input impedance Za viewed from the feed terminal 330 can be adjusted by varying the capacitance of C1, C2 and C3 with respect to $G_{t1}+jB_{t1}$, $G_{t2}+jB_{t2}$ and $G_s+jB_s$.

C1, C2 and C3 can be adjusted by varying the thickness and the dielectric constant of the upper dielectric substrate 320, on which the capacitors 321, 322 and 323 are stacked, and the area of the capacitors 321, 322 and 323.

Meanwhile, in FIG. 3, the inductance L can be adjusted by varying the length and the width of the connection part 324 between the capacitors 321 and 322 stacked on different microstrip lines 311 and 312. In this manner, the exemplary tag antenna 26 can be effectively impedance matched with respect to the RF front end 22 of the RFID tag chip that has small resistance component and large capacitive reactance component.

Figure 5:
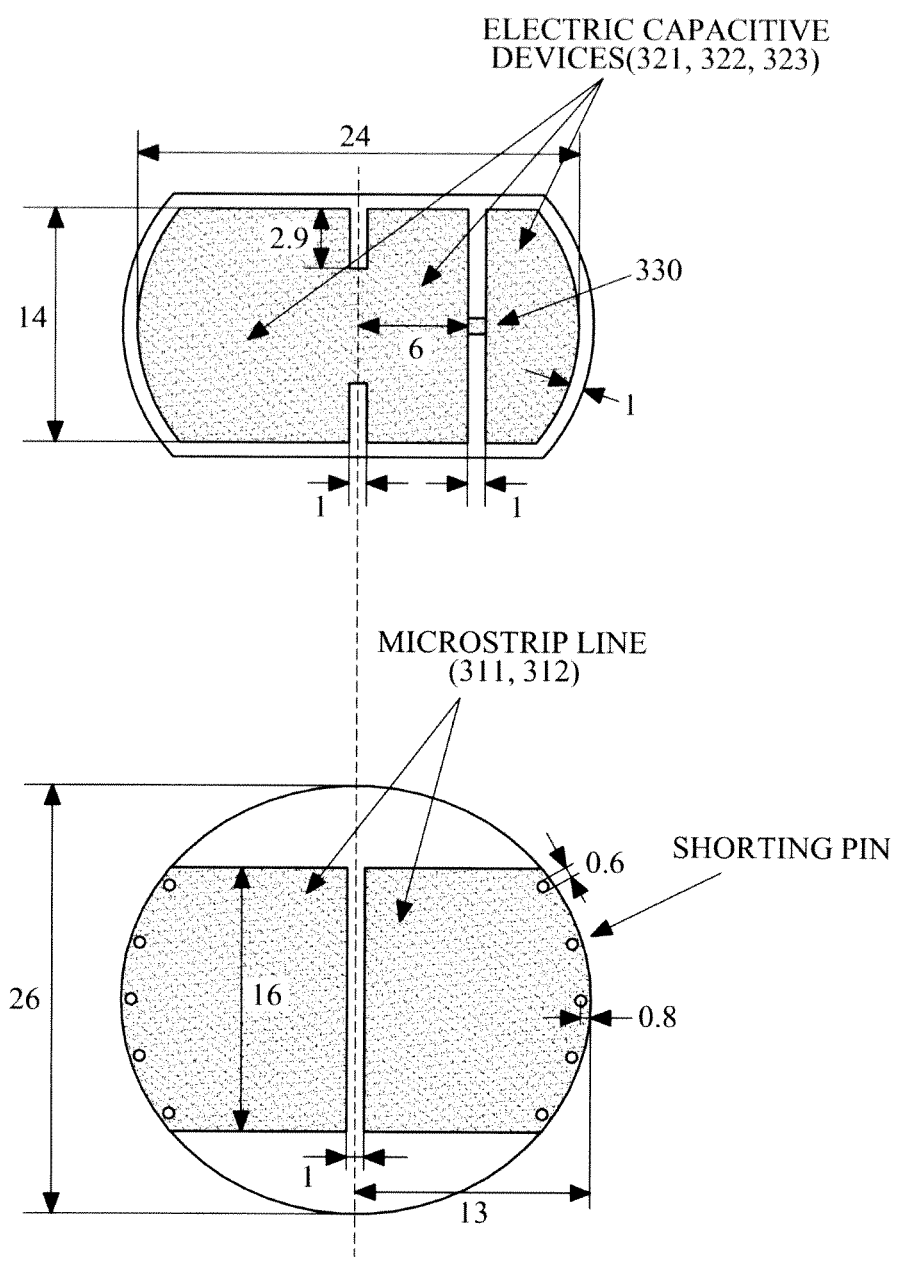
FIG. 5 is a plan view showing the exemplary tag antenna.
Figure 6:
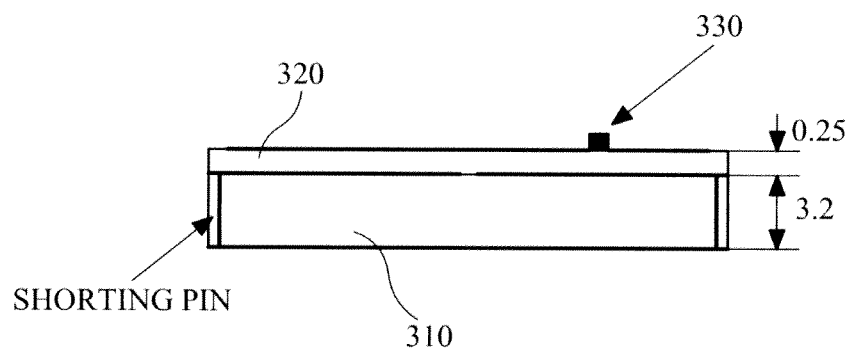
FIG. 6 is a side view showing the exemplary tag antenna.
Figure 7:
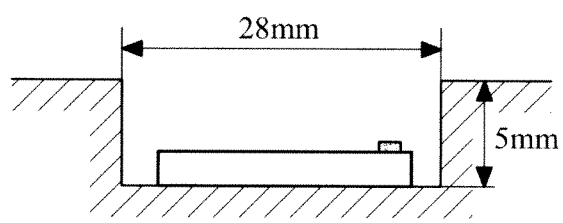
FIG. 7 is an assembled view of the exemplary tag antenna.

FIG. 5 is a plan view showing the exemplary tag antenna, FIG. 6 is a side view showing the exemplary tag antenna, and FIG. 7 is an assembled view of the exemplary tag antenna.

As shown in FIG. 5, the exemplary tag antenna is provided in a circular shape and has a diameter of 26 mm. The tag antenna may be implemented in the dimension shown in FIG. 5 but the present invention is not limited thereto. In addition, in FIG. 6, the lower dielectric substrate 310 having the microstrip lines may be formed using a frame retardant 4 (FR-4) substrate having a relative permittivity of 4.3 and a loss tangent of 0.017. As shown in FIGS. 5 and 6, the microstrip lines are shorted to the ground plane through a metal shorting pin.

As shown in FIG. 7, the exemplary tag antenna is inserted into a circular groove that is formed in a circular metal object or a high permittivity object and has a diameter of 28 mm and a depth of 5 mm. The areas of the three planar type capacitors are mutually adjusted such that the antenna is conjugate matched to the tag chip having an impedance value of 12-133 Ω.

Figure 8:
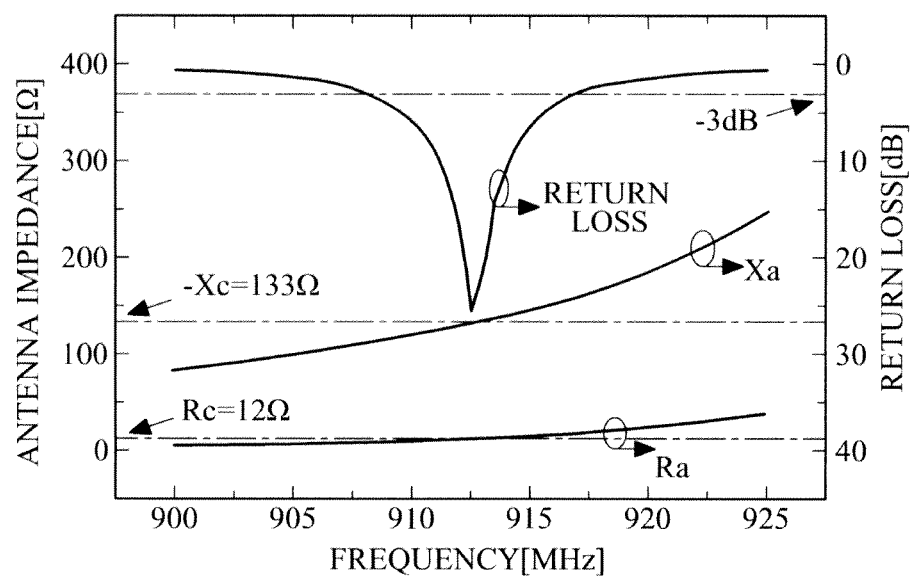
FIG. 8 is a graph showing a simulation result of an input impedance of the exemplary tag antenna and a return loss for a tag chip.

FIG. 8 is a graph showing a simulation result of an input impedance of the exemplary tag antenna and a return loss for a tag chip. As shown in FIG. 8, the antenna impedance is 12+j133Ω at 912 MHz, and impedance matching is achieved between the antenna and the tag chip.

Figure 9:
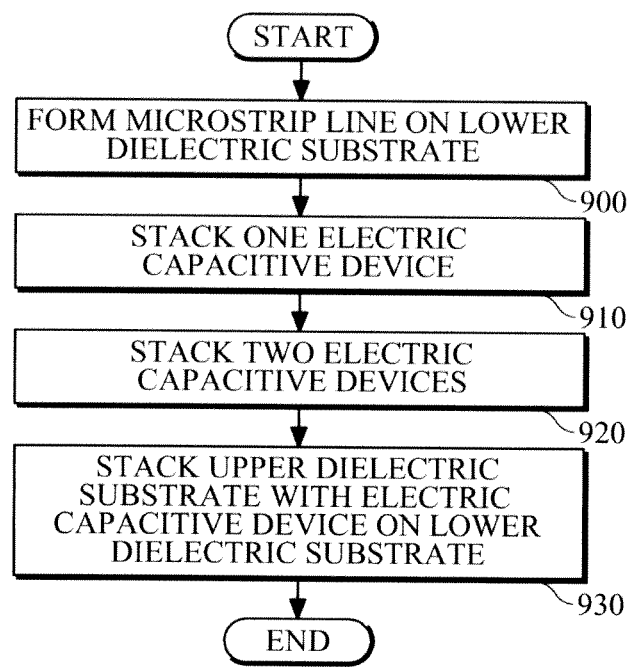
FIG. 9 is a flowchart showing an exemplary method of manufacturing a tag antenna.

FIG. 9 is a flowchart showing an exemplary method of manufacturing the tag antenna.

First, a microstrip line, which has an end shorted to a ground plane formed on a lower surface of a lower dielectric substrate, is formed on an upper surface of the lower dielectric substrate (operation 900). In this case, the forming of microstrip line includes forming two microstrip lines. The two microstrip lines each have an open end, the open ends spaced apart from each other from the middle of the lower dielectric substrate while facing each other to form is a radiating slot from which radiation of electromagnetic waves occurs. In addition, one of the microstrip lines is shorted to the ground plane by a shorting member formed on one face of the lower dielectric substrate and the other one of the microstrip lines is shorted to the ground plane by a shorting member formed on an opposite face of the lower dielectric substrate. The shorting member is formed using a shorting plate or a shorting pin.

After that, one electric capacitive device is stacked on an upper dielectric substrate while overlapping one of the microstrip lines (operation 910). In addition, two electric capacitive devices are stacked on the upper dielectric substrate while overlapping the other one of the microstrip lines (operation 920). The electric capacitive device may include a planar type capacitor or an open-circuit stub using a microstrip line.

Then, a feed terminal used to mount a tag chip is disposed between the two electric capacitive devices overlapping the same microstrip lines.

Finally, the upper dielectric substrate, on which at least one electric dielectric device is stacked, is stacked on the lower dielectric substrate (operation 930).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other in implementations are within the scope of the following claims.

What is claimed is:

1. A tag antenna comprising:
    a lower dielectric substrate which is provided at a lower surface thereof with a ground plane and at an upper surface thereof with a microstrip line having an end shorted to the ground plane; and
    an upper dielectric substrate, which is provided at an upper surface thereof with a plurality of capacitive devices and is stacked on the lower dielectric substrate,
    wherein the lower dielectric substrate includes two microstrip lines each having an open end, the open ends spaced apart from each other from a middle of the lower dielectric substrate while facing each other to form a radiating slot from which radiation of electromagnetic waves occurs,
    wherein the upper dielectric substrate includes:
        a first capacitive device of the plurality of capacitive devices to be stacked on one of the microstrip lines;
        a second capacitive device and a third capacitive device of the plurality of capacitive devices to be stacked on the other one of the microstrip lines; and
        a feed terminal which is disposed between the second and the third capacitive devices and used to mount a tag chip.

2. The tag antenna of claim 1, wherein one of the microstrip lines is shorted to the ground plane by a shorting member, which is formed on one face of the lower dielectric substrate, and the other one of the microstrip lines is shorted to the ground plane by a shorting member, which is formed on an opposite face of the lower dielectric substrate.

3. The tag antenna of claim 2, wherein the shorting member may be a shorting pin or a shorting plate.

4. The tag antenna of claim 1, wherein the first capacitive device of the plurality of capacitive devices includes a planar type capacitor.

5. The tag antenna of claim 1, wherein the first capacitive device of the plurality of capacitive devices is an open-circuited stub implemented using a microstrip line.

6. The tag antenna of claim 1, wherein the ground plane is provided by forming a ground plate on the lower surface of the lower dielectric substrate.

7. A method of manufacturing a tag antenna, the method comprising:
    forming a microstrip line, which has an end shorted to a ground plane formed on a lower surface of a lower dielectric substrate, on an upper surface of the lower dielectric substrate;
    stacking a first capacitive device on an upper dielectric substrate while overlapping one of the microstrip lines;
    stacking a second capacitive device and a third capacitive device on the upper dielectric substrate while overlapping the other one of the microstrip lines; and
    stacking the upper dielectric substrate on the lower dielectric substrate,
    wherein the forming of the microstrip line comprises forming two microstrip lines each having an open end, the open ends spaced apart from each other from a middle of the lower dielectric substrate while facing each other to form a radiating slot from which radiation of electromagnetic waves occurs,
    wherein the stacking of the second and the third capacitive devices comprises generating a feed terminal which is disposed between the second and the third capacitive devices and used to mount a tag chip.

8. The method of claim 7, wherein, in the forming of the two microstrip lines, one of the microstrip lines is shorted to the ground plane by a shorting member formed on one face of the lower dielectric substrate and the other one of the microstrip lines is shorted to the ground plane by a shorting member formed on an opposite face of the lower dielectric substrate.

* * * * *